(12) United States Patent
Pedersen

(10) Patent No.: US 7,646,114 B2
(45) Date of Patent: Jan. 12, 2010

(54) SYSTEM FOR AND A SHIP HAVING A SYSTEM FOR CONNECTING OF SHORE POWER TO THE SHIP WHILE DOCKED

(75) Inventor: Lars Robert Pedersen, Jyllinge (DK)

(73) Assignee: A.P Moller-Maersk A/S, Copenhagen K (DK)

(*) Notice: Subject to any disclaimer, the term of this patent is extended or adjusted under 35 U.S.C. 154(b) by 29 days.

(21) Appl. No.: 11/106,036

(22) Filed: Apr. 14, 2005

(65) Prior Publication Data
US 2006/0232132 A1 Oct. 19, 2006

(51) Int. Cl.
*H02J 3/00* (2006.01)
*B60L 11/00* (2006.01)

(52) U.S. Cl. .............................. 307/80; 440/6
(58) Field of Classification Search ............. 307/80; 440/6
See application file for complete search history.

(56) References Cited

U.S. PATENT DOCUMENTS 3,987,744 A * 10/1976 Blumberg et al. ....... 114/144 B
5,510,659 A * 4/1996 Lewis et al. ................... 307/11
6,957,990 B2 * 10/2005 Lowe ............................ 440/6

FOREIGN PATENT DOCUMENTS

| EP | 0 730 333 | 9/1996 |
| EP | 1 667 301 | 6/2006 |
| WO | 2004/028899 | 4/2004 |

OTHER PUBLICATIONS

"The Port of Los Angeles: Alternative Maritime Power (AMP)" American Association of Port Authorities 2004 Environmental Awards Competition (2004) p. 1-12.
Rieckmann, M. "Primary Power Bus for a RoRo Vessel" Kurzfassungen der Vortrage des Sprechtages (2003) pp. 211-216 XP-002389101.

* cited by examiner

*Primary Examiner*—Albert W Paladini
*Assistant Examiner*—Hal I Kaplan
(74) *Attorney, Agent, or Firm*—Ladas and Parry LLP

(57) ABSTRACT

A ship has electrical consumers connected to an electrical distributor by respective supply lines for delivering electrical power. A connector device connects a shore cable with a selected one of the supply lines for delivering the electrical power towards the electrical distributor, the selected one of the supply lines being a supply line to a thruster.

3 Claims, 2 Drawing Sheets

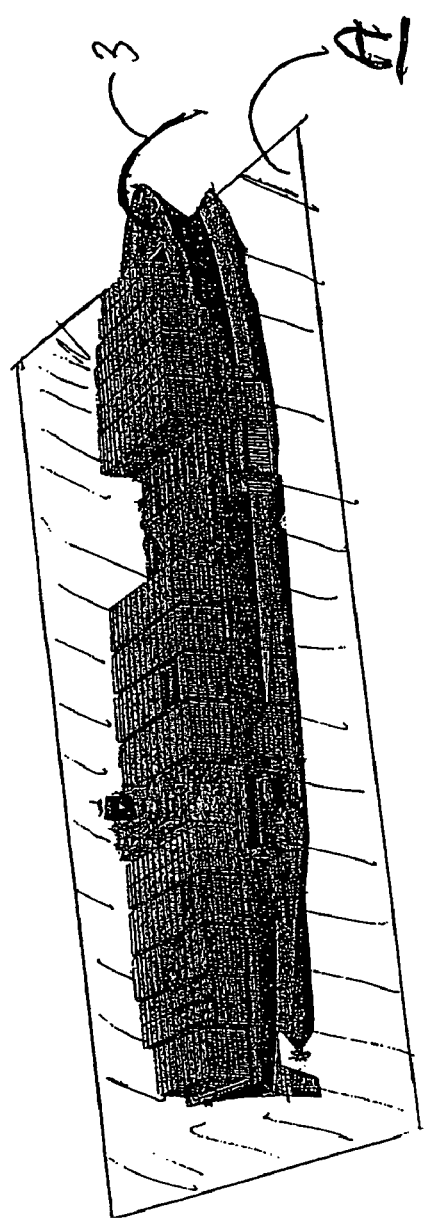

SYSTEM FOR AND A SHIP HAVING A SYSTEM FOR CONNECTING OF SHORE POWER TO THE SHIP WHILE DOCKED

The invention relates to a ship comprising a plurality of electrical consumers connected to an electrical distributor by means of respective supply lines for delivering electrical power.

Ships in ports normally use their diesel engines to supply electricity while docked. Cargo ships, especially need an uninterrupted supply of electricity to supply the refrigeration units while docking at port. The power is normally generated by diesel generators and is known as "Hotelling Power". The use of diesel generators to produce power while docked in harbors results in exhaust emission affecting the local area. Therefore, "hotelling power" may be delivered by systems capable of supplying/receiving shore based electrical power to ships docking at ports.

The technology to supply ships with shore based electrical power has been used by the US military as well as private yachts. There are also known facilities in Alaska for cruise ships and a known facility for cargo ships in Los Angeles harbor.

A problem associated with prior art systems is the need for new cables and new cable ducts for the cable and installation of the necessary electrical board to receive the electricity from shore.

According to an aspect of the invention a ship is provided, the ship is prepared to receive electricity from shore in a simpler manner than hitherto known, the ship comprising a connector device for connecting a shore cable with a selected one of the supply lines for delivering electrical power towards the electrical distributor by the selected supply line, the selected supply line being the supply line to a thruster.

By providing the ship with a connection to a supply line for an onboard electrical consumer, the existing supply line can then serve as both a supply for the consumer and, when in port, a supply of shore power in the reverse direction.

The invention in another embodiment is to provide an electrical supply system for a ship of the kind mentioned in the opening paragraph, the electrical supply system comprising a connector device for connecting a shore cable with a selected one of the supply lines for delivering electrical power towards said electrical distributor by said selected supply line, the selected supply line being the supply line to a thruster.

Another problem associated with the prior art methods for delivering electricity to cargo ships or cargo handling ships is that the shore cable passes from the dock to the ship either by the side or by the stern. In both situations the cable passes through the cargo or container handling area and is therefore in danger of interfering with operations such as loading and discharging of containers or cargo. There is also a danger of interference with persons present in this area.

The invention is to provide a ship comprising at least one electrical consumer arranged in a forward end of the ship and connected to an electrical distributor (preferably being arranged remotely from the forward end) by respective consumer supply lines, for delivering electrical power to the at least one consumer, the ship further comprising a connector device for connecting a shore cable with a shore power supply line running in the same cable ducts as the consumer supply lines, for delivering electrical power towards the electrical distributor by the shore power supply line The invention in another embodiment provides a connector device for connecting a shore cable with a shore power supply line running in the same cable ducts as the consumer supply lines, for delivering electrical power towards the electrical distributor by the shore power supply line.

By providing the ship with a connector device for connecting a shore cable with a shore power supply line running in the same cable ducts as the supply lines it is possible to use the already existing cable ducts for electrical consumers arranged in a forward end of the ship. This also gives rise to the possibility of providing an entrance for the shore cable at the fore end of the ship, thereby arranging the shore cable away from the normal cargo handling area.

By further providing the ship with shore cable receiving means at the forward end of the ship with a connector to a supply line to at least one bow thruster, the existing supply line and switch gear and other existing equipment in the electrical distributor can then serve a dual purpose as both supply for the large consumer and, when in port, supplying of shore power in the reverse direction.

It should be emphasized that the term "comprises/comprising" when used in this specification is taken to specify the presence of stated features, integers, steps or components but does not preclude the presence or addition of one or more other features, integers, steps, components or groups thereof.

The term "electrical distributor" includes the ship's main board. The term "shore cable"; includes all cables that deliver electrical power produced on the shore to a docking ship. The shore cable doesn't necessarily have to go from the shore, but could come from, e.g., a barge or barges having thereon cable management systems, which may include a motorized reel to store the cable, transformer(s) and a distribution board(s).

DESCRIPTION OF THE DRAWINGS

The invention will be described in detail in the following with reference to the drawings in which:

FIG. 2 is a perspective drawing of a container ship.

Figure 1:
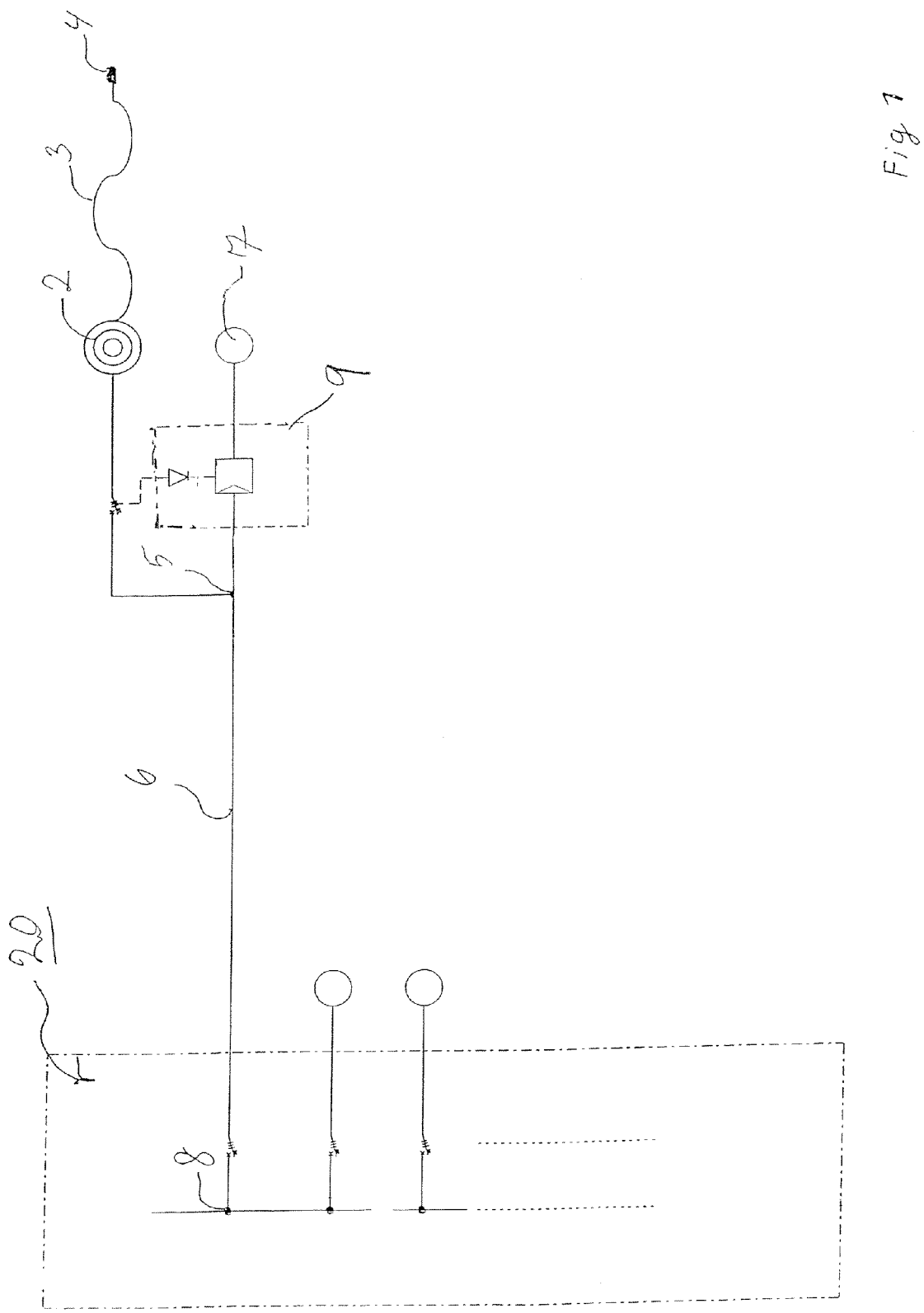
FIG. 1 is a principal diagram shoving the new installation.

Ships in ports normally use their engines to supply electricity while docked. Cargo ships, especially need an uninterrupted supply of electricity to supply the refrigeration units while docking at port. The power is normally generated by diesel generators and is commonly known as "Hotelling Power". However, the use of internal diesel generators to produce power while docked has disadvantages because of the pollution. Therefore, "hotelling power" may be delivered by systems capable of supplying shore based electrical power to ships docking at ports.

The technology to supply ships with shore based electrical power has been used by the US military as well as private yachts. There are also known facilities in Alaska for cruise ships, however the delivery of shore based electrical power to cargo or container ships involves other challenges due to the fact that a harbor visit normally involves loading and unloading of cargo and/or containers which requires—due to safety reasons—the area wherein these operations takes place to be free. Therefore, the shore power connection cable is preferably connected to the fore end or the forecastle of these ships, which again requires considerable ship modifications mainly due to the necessary establishment of a new main board (electrical distributor), new cables and new paths for the cables inside the ships.

The electrical distributor (main board—via thruster supply section), cables and cable ways (cable ducts) already established for the delivering of electrical power towards electrical consumers onboard, e.g. the thrusters or the bow thrusters or other large electrical consumers, are according to the invention used in the reverse direction to provide an electrical supply system for the ship.

The principal diagram in FIG. 1 shows an embodiment of the invention comprising a tension wheel 2 for storing the cable 3 and a shore supply socket 4. The cable 3 has an Interface 5 to the supply line 6 to a bow thruster 7 which is connected to the electrical distributor 20 at 8. Switching gear 9 is located between the connector device and the electrical distributor so as the switch the flow of current between flow from the distributor to the thruster and flow between the connector and the distributor. However, it should be understood that other electrical device line (s) could be used, and 10 therefore the connection point doesn't necessary have to be on the supply lines to a bow thruster.

Turning now to FIG. 2 showing a container ship having a shore cable connection at the fore end thereby bringing the cable 3 out of the area A (illustrated by being hatched) wherein cargo or container handling normally takes place.

Space is a valuable commodity upon ships and therefore the cable managing system is normally accommodated on the harbor. Using the forefront (forecastle) of the ship to pass over the shore cable entails utilization of the normally unused space in the fore end (forecastle) of the ship to accommodate the cable managing system. There is even room for accommodating a motorized reel, cable, and a transformer in the forefront. It is thereby possible to establish a system onboard, by which a ship can connect directly to e.g. a 6.6 kV outlet located on the wharf without sacrificing precious (cargo) space onboard.

The electrical system onboard the ship (not described in detail) may comprise any manual or automatic power transfer mechanism including automatic and software driven computerized power transfer mechanism.

The invention claimed is:

1. A cargo ship comprising a plurality of electrical consumers connected to an electrical distributor by means of respective supply lines for delivering electrical power, said ship comprising a connector for connecting a shore cable with a selected one of said supply lines for delivering electrical power towards said electrical distributor by said selected supply line, said selected one of said supply lines being a supply line to a thruster wherein switch gear is located between the thruster and the electrical distributor so as to switch the flow of current between flow from the distributor to the thruster and flow from the connector to the distributor.

2. An electrical supply system for a ship, said ship comprising a plurality of electrical consumers connected to an electrical distributor of said electrical supply system by means of respective supply lines of said electrical supply system, for delivering electrical power to said electrical consumers, said electrical supply system comprising a connector for connecting a shore cable with a selected one of said supply lines for delivering electrical power towards said electrical distributor by said selected supply line, said selected one of said supply lines being a supply line to a thruster wherein switching gear is located between the thruster and the electrical distributor so as to switch the flow of current between flow from the distributor to the thruster and flow from the connector to the distributor.

3. A cargo ship comprising a plurality of electrical consumers connected to an electrical distributor by means of respective supply lines for delivering electrical power, said ship comprising a connector device for connecting a shore cable with a supply line linking said electrical distributor to a thruster and switch gear located between the electrical distributor and the thruster and arranged that when the connector device is connected to the shore cable, electric power may flow from the shore cable to the electrical distributor and when the connector device is not connected to the shore cable, electric power may flow from the distributor to said thruster.

* * * * *